United States Patent
Erkkilä et al.

(12)
(10) Patent No.: US 6,480,724 B1
(45) Date of Patent: *Nov. 12, 2002

(54) MODULAR MOBILE COMMUNICATION SYSTEM

(75) Inventors: Marko Erkkilä, Siuro (FI); Arto Peuhu, Tampere (FI); Jouko Haavisto, Nokia (FI); Mika Isotalo, Tampere (FI)

(73) Assignee: Nokia Mobile Phones Ltd., Espoo ( * ) Notice: Subject to any disclaimer, the term of this patent is extended or adjusted under 35 U.S.C. 154(b) by 0 days.

This patent is subject to a terminal disclaimer.

(21) Appl. No.: 09/827,761

(22) Filed: Apr. 6, 2001

Related U.S. Application Data

(63) Continuation of application No. 08/942,074, filed on Oct. 1, 1997, now Pat. No. 6,219,560.

(30) Foreign Application Priority Data

Oct. 3, 1996 (FI) .................................................. 963960

(51) Int. Cl.⁷ .................................................. H04Q 7/32
(52) U.S. Cl. ........................ 455/557; 455/550; 455/566; 348/373
(58) Field of Search ................................. 455/550, 556, 455/557, 558, 566, 66; 235/380; 348/14.1, 14.02, 14.03, 14.04, 14.05, 373

(56) References Cited

U.S. PATENT DOCUMENTS

| 5,189,632 A | 2/1993 | Paajanen et al. ........ 364/705.05 |
| 5,257,257 A | 10/1993 | Chen et al. ................... 370/18 |
| 5,313,661 A | 5/1994 | Malmi et al. ............. 455/232.1 |
| 5,335,276 A | 8/1994 | Thompson .................... 380/21 |
| 5,353,328 A | 10/1994 | Jokimies ....................... 379/58 |
| 5,392,282 A | 2/1995 | Kiema .......................... 370/77 |
| 5,475,441 A | 12/1995 | Parulski et al. ............. 348/552 |
| 5,604,921 A | 2/1997 | Alanara ........................ 455/45 |
| 5,655,092 A | 8/1997 | Ojala .......................... 395/309 |
| 5,657,371 A | 8/1997 | Suomi et al. ................ 455/418 |
| 5,890,016 A | 3/1999 | Tso .............................. 395/884 |
| 6,219,560 B1 * | 4/2001 | Erkkila et al. .............. 455/557 |

FOREIGN PATENT DOCUMENTS

| EP | 0526802 A3 | 2/1993 |
| JP | 06268582 A | 9/1994 |
| WO | WO 96/26575 | 8/1996 |

* cited by examiner

Primary Examiner—Nay Maung
(74) Attorney, Agent, or Firm—Perman & Green, LLP

(57) ABSTRACT

A modular system for personal data acquisition and communication, is expanded advantageously a cellular telephone system the functions of which can be increased by means of various expansion cards. A host device in the system according to the invention, such as a mobile communication device, need not be equipped with all possible functions in the manufacturing stage but some of the functions can be realized on expansion cards, and the user can add a desired function to the host device according to need. The expansion cards are small and they are installed substantially inside the host device, such as a mobile communication device, so that the entity formed by the host device and the expansion card seems to the user as a single compact device. Advantageously, the expansion cards include, in addition to the hardware needed, also the software required for controlling the operation of the modules.

23 Claims, 4 Drawing Sheets

MODULAR MOBILE COMMUNICATION SYSTEM

This application is a continuation of U.S. Ser. No. 08/942,074, filed Oct. 1, 1997 now U.S. Pat. No. 6,219,560.

BACKGROUND OF THE INVENTION

This invention relates to personal mobile communication devices and corresponding small handheld apparatuses designed for data acquisition and communication.

There exist prior art personal communication devices and/or mobile organizers, such as notebook microcomputers or similar apparatuses which are small, lightweight, portable workstations operated in one's hand and/or lap. Such a personal device can be equipped with a number of accessories and application programs offering service functions according to needs.

It is known, for example, systems of the type disclosed in the U.S. Pat. No. 5,475,441 (Parulski et al.) wherein a separate camera is connected via a flexible or fixed connection wire to a portable computer. From the user's point of view, this kind of a system is too laborious: the user has to carry along two separate apparatuses and possibly a connection cable, too. Such a camera cannot remain attached to the host device all the time because it is attached to the host device by means of an electrical connector, thus being highly susceptible to impacts or dropping.

It is also known to build a camera inside a mobile communication device. Such an arrangement is disclosed e.g. in the Japanese patent document 06268582A. In the system described in said document the camera is an integral part of the communication device. The system comprises a camera unit, which reads picture information in digital format, a mobile communication unit, which handles the radio connection, a bus, to which the camera unit and the mobile communication unit are connected, and a control unit, which controls the operation of the camera unit and the mobile communication unit. This kind of an arrangement eliminates most of the disadvantages of the system described above, but the disadvantage here is that the camera is integrated: the buyer has to pay for the camera unit even if he did not need it. In addition, the camera unit can only be used in connection with the mobile communication device to which it is integrated.

A Finnish patent application 942334 (Nokia Mobile Phones Ltd.) discloses a system wherein a camera built on a PCMCIA card can be connected to a mobile communication device. A disadvantage of such a system is the extrinsic quality of the PCMCIA card camera: it is attached to a connector on the side of the host device, thereby making the host device bigger and altering its appearance. Furthermore, an impact may cause the camera to come off the host device. In addition, the construction of the PCMCIA camera described in said application is complex: it includes, among other things, a picture-processing unit for the processing of pictures by the camera card.

An object of the invention is to provide a system for personal data acquisition and communication with characteristics easily modified by the user. Another object of the invention is to provide a system to which new functions and properties can be added even after the host device has been completed. A further object of the invention is to provide a system in which the host device constitutes an integral whole even when the expansion card is connected to the host device. A yet further object of the invention is to provide a system which, in addition to audio and text based communication, facilitates visual communication.

SUMMARY OF THE INVENTION

The objects are achieved by realizing a modular system comprising a host device and expansion cards which can be fitted in the host device, and by realizing some of the system functions on the expansion cards. Then the user can add a new function in the host device by installing an expansion card in a connector socket in the host device. In the system according to the invention, the expansion card and the connector socket are realized in such a manner that an expansion card attached to the connector socket remains inside the body of the host device, thereby making the entity constituted by the host device and the expansion card seem to the user as one single apparatus. External equipment related to a function realized by the expansion card, such as an optical unit of a digital camera, may also be located partly or wholly outside the body of the host device, depending on the function of said equipment. Advantageously the expansion cards comprise, in addition to the expansion card hardware, also the software required for controlling the expansion cards, in which case the host device receives the programs in question when an expansion card is inserted in it and the programs are removed when the expansion card is removed.

One object of this invention is to provide a new expansion card by means of which a camera can be added as an integral part to a portable apparatus, especially a mobile communication device.

This object is achieved by realizing in connection with an expansion card a digital camera comprising a picture-sensing element, an optical unit and a memory element for storing the program controlling the operation of the camera.

An object of this invention is to provide a portable apparatus for personal communication, to which the user can in a simple manner add new accessories and additional functions without having to separately install control software for the accessory in question, and said apparatus not being provided with the control software of the accessory in question in the manufacturing stage of said apparatus.

This object is achieved by providing in the apparatus an expansion card connector socket, and by making the apparatus read identification information from an expansion card inserted in the connector socket so as to enable the apparatus to start the program on the expansion card which controls the operation of the expansion card.

The system according to the invention is characterized in that the host device comprises at least one connector socket for expansion cards and the system further comprises at least one expansion card adapted to be installed inside the host device in order to add an extra function in the function selection of the host device.

The expansion card according to the invention is characterized in that an additional function is fitted on the expansion card in order to make the functions of said device more versatile, and the hardware required to realize said additional function is fitted on said expansion card, and a memory element for storing the software required for controlling the hardware is fitted on said expansion card.

The device according to the invention is characterized in that the device is arranged to read identification information from an expansion card connected to the expansion card connector socket and to determine whether said identification information indicates that the expansion card comprises a program needed for controlling the expansion card, and, if the identification information of the expansion card indicates that the expansion card comprises the program needed for controlling the operation of the expansion card, to control the functions of the expansion card by means of said program, needed for controlling the expansion card.

The invention is directed to a modular personal information acquisition and communication system, preferably a cellular telephone system the functions of which can be increased by means of various expansion cards. Thus, the host device in the system according to the invention, say, a mobile communication device, need not be equipped with all the possible functions in the manufacturing stage but some of the functions can be realized by expansion cards so that the user can add a desired function to the host device when needed. The expansion cards are small in size and they are installed substantially inside the host device, such as a mobile communication device, thereby making the entity constituted by the host device and the expansion card seem to the user as a single compact device. Advantageously, the expansion cards include, in addition to the required hardware, also the software needed to control the operation of the modules.

The invention is described in greater detail with reference to the preferred embodiments, presented by way of example, and to the attached drawing, wherein

BRIEF DESCRIPTION OF THE DRAWINGS

Like elements in the drawing are denoted by like reference designators.

DETAILED DESCRIPTION OF THE INVENTION

Figure 1:
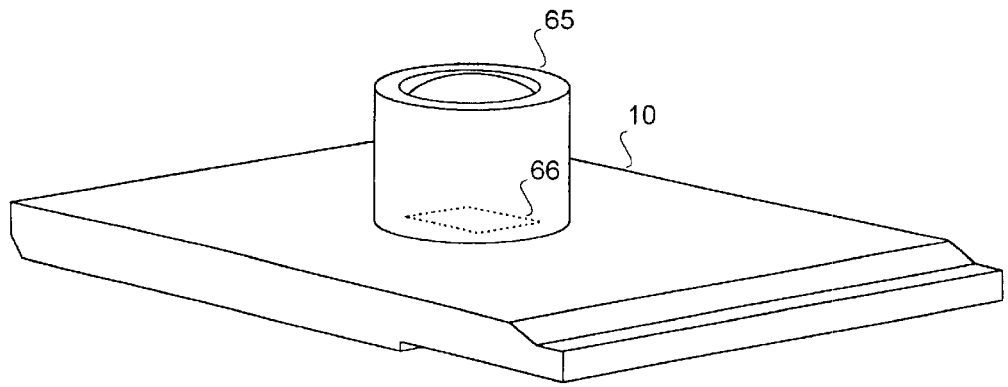
FIG. 1 shows an expansion card in the system according to the invention with a digital camera implemented on it.

Functions can be added in the system according to the invention by means of small expansion cards located substantially inside the host device. Advantageously the expansion cards comprise, in addition to the hardware required by the new function, also the necessary control software and identification information by means of which the host device can determine whether the expansion card contains the software needed and if so, execute the software. By means of such a modular system the user can add new functions in his mobile communication device, and equipment manufacturers can offer to the users the possibility of using new additional functions in the mobile communication devices they have already acquired. The expansion cards are preferably located inside the host device and the system according to the invention constitutes one single integrated whole and seems to the user as one single device. The host device is advantageously provided with more than one expansion card connector socket, thereby enabling very versatile expansion of host device functions. In a preferred embodiment of the invention, the host device also comprises a cellular telephone unit, and it can be used as a mobile communication device.

The system according to the invention can be advantageously applied to personal digital assistants (PDA), mobile communication devices, portable computers and multipurpose communication devices. A multipurpose communication device here refers to a portable device that can be used for communication in many ways: e.g. as a wireless telephone, computer terminal and receiving and transmitting fax.

If an expansion card is to be used in host devices of different types wherein one and the same control program cannot be used because of different architectures, it is possible to store in the expansion card memory more than one control program so that each control program is adapted for a certain type of a host device. Then the host device in question will recognize the right program version on the basis of the expansion card identification information. The expansion card can also be advantageously controlled by means of a program which is stored outside the expansion card and loaded into the host device, so that the expansion card can also be used in host devices that do not have the correct program for the expansion card.

In a preferred embodiment of the invention, an expansion card can be used for adding to the system an extra microphone, the amplifier electronics for the microphone and an interface program for integrating the functions of the host device and the expansion card. The sensitivity and directivity characteristics of such an extra microphone are advantageously such that they are adapted to record sounds coming e.g. from farther away than the microphone of the host device, so that a system with an extra microphone is especially suitable for conveying the utterances of all parties of an interview or meeting, for example.

In another preferred embodiment of the system, an expansion card can be used for adding to the system security devices, such as encryption circuits and password modules to encrypt the messages sent.

In a preferred embodiment of the system, an expansion card can be used for adding to the system interfaces for external devices. By means of such an arrangement it is possible to connect to the host device accessories that cannot be connected directly to the host device. In such an embodiment, the expansion card contains a program for adding the functions of the accessory to the host device software. With this kind of an arrangement the implementation of the mechanical construction and software of the host device need not include interfaces for all possible accessories, which considerably simplifies the construction of the host device.

Advantageously, such interfaces include, say, an interface for an additional loudspeaker, an interface for pointing devices such as a mouse or a digitizing tablet, an interface for a bar code reader, so that the system can be used e.g. for making an inventory of items marked with bar codes, or an interface for an external display, in which case the system can be connected to a larger display for desktop or conference room use.

If necessary, parts of expansion cards providing interfaces for external devices can also be located outside the host device. An example of such an embodiment is an expansion card providing a printer interface, comprising a connector outside the host device, connected through a cable to the expansion card which includes the printer interface control software. By means of such an arrangement the host device can be connected to any ordinary printer if there is no modern printer with an infrared interface available. By means of such an arrangement the system can be equipped with an interface which cannot be implemented in the small host device because of the large size of the connector according to older technology.

In the preferred embodiment of the invention shown in FIG. 1, the system comprises a host device and a digital camera realized on an expansion card. The camera comprises an expansion card 10 and an optical unit 65. The optical unit produces an image for a picture-sensing element 66 located on the expansion card. The optical unit 65 includes the optical elements, such as lenses, needed for producing the picture, and advantageously a shutter, too. Advantageously, in addition to normal images, the optical unit 65 of the camera also enables so-called macrophotographing, or the photographing of small objects.

The picture-sensing element 66 may be a prior-art CCD element or a corresponding element such as one implemented by the CMOS picture element technology under development.

Figure 2:
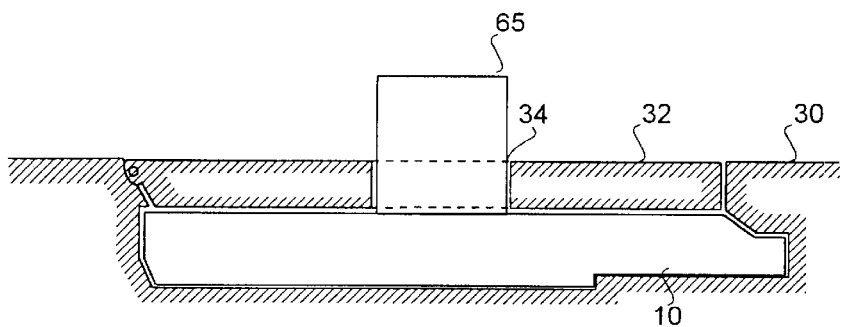
FIG. 2 shows the system according to the invention when the digital camera on the expansion card is connected to the expansion card connector socket of the host device.

FIG. 2 shows, in accordance with an embodiment of the invention, a cross-section of an expansion card camera installed in a host device. Because of the large size of the optical unit and to enable photographing, the optical unit 65 is partly outside the shell 30 of the host device. In this embodiment, the lid 32 of the expansion card connector socket which is part of the host device, has an opening 34 for the optical unit 65.

Figure 3:
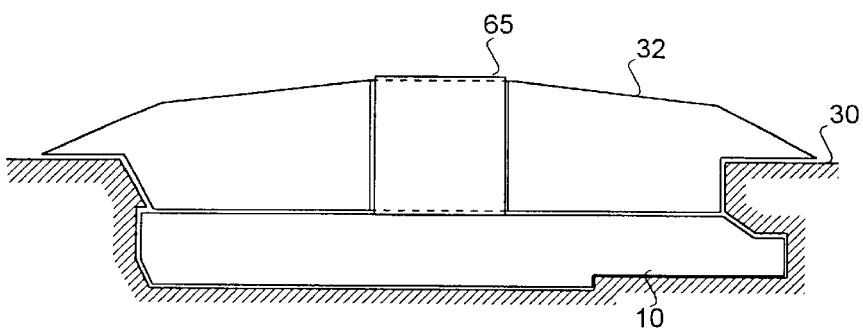
FIG. 3 shows another lid arrangement for the expansion card connector socket in the system according to the invention when the expansion card is connected to the expansion card connector socket of the host device.

FIG. 3 shows by way of example an embodiment wherein the expansion card lid arrangement is realized in a manner different from the one described above. In this embodiment, the lid 32 is an element on the camera unit, separate from the host device, pushed onto its place by the user after the camera has been installed in its connector socket.

Figure 4:
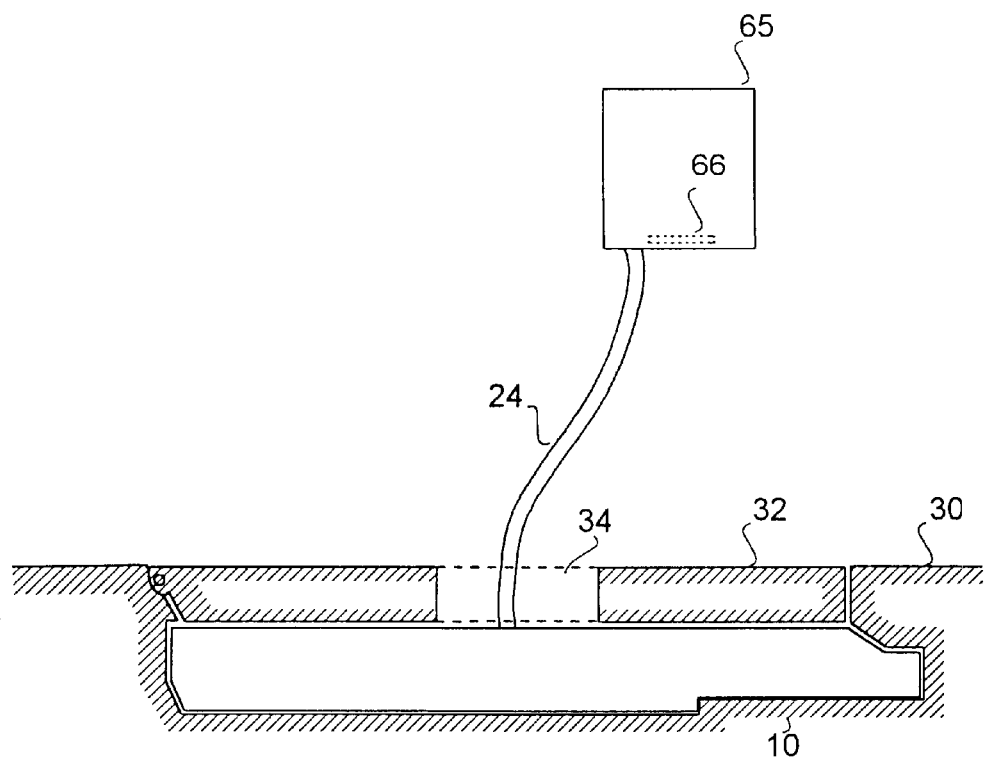
FIG. 4 shows a possible embodiment of the expansion card of the system according to the invention.

In a preferred embodiment of the invention, the optical unit 65 of the camera is an integral part of the expansion card 10, as shown in FIGS. 1 to 3. The camera is then compact and easy to use. It is, however, possible that a particular host device type is not designed to be connected to a camera, in which case it may be impossible to connect an expansion card camera according to FIG. 1 to such a host device because of lack of space needed by the optical unit 65, or the photographing direction of the expansion card camera may be inconvenient. To overcome this problem, the expansion card camera can be realized in the manner according to FIG. 4. FIG. 4 shows an embodiment wherein the optical unit 65 is separate from the expansion card, so that the picture-sensing element 66 is fitted in the optical unit, and the picture-sensing element and the optical unit are connected to the expansion card via an intermediate cable. Then, the attachment position of the optical unit in the host device and the photographing direction with respect to the host device can be varied in ways more diverse than in the embodiments shown in FIGS. 1 to 3. This kind of an arrangement makes it possible to use the expansion card camera in host devices where the expansion card connector socket is located inconveniently with respect to the camera use.

For storing the pictures, such an expansion card camera may use the memory of the host device or, more advantageously, memory on the expansion card, which reduces the amount of memory needed in the host device and thus reduces the price of the host device.

In the system according to the invention, the user controls the camera through the user interface of the host device. In an embodiment of the invention, a picture recorded by the camera is displayed by the host device, and the host device updates its display at short intervals and the user can then direct the camera to a desired target by watching the display of the host device. The host device saves a picture when the user issues a save command e.g. by pushing a certain button.

Such a modular system can be advantageously implemented by means of expansion cards complying with the new Miniature Card standard, for example. The Miniature Card standard is a new expansion card standard meant for various small portable devices, such as portable sound reproduction equipment, digital cameras, mobile communication devices and portable computers. The standard is described e.g. on page 25 of the March 1996 issue of Electronic Engineering. The Miniature Card is small, about 38×33×3.5 mm, and its main fields of application are various memory units, such as system memory expansion cards and electronic disk drives. An expansion card according to the Miniature Card standard includes identification information, or so-called AIS information, on the basis of which the host device can determine the type of expansion card connected to the host device. In a card according to the Miniature Card standard, the AIS information may be located, say, in an EEPROM memory on the card, wherefrom the host device can read it through a serial I²C interface. In addition, an expansion card according the Miniature Card standard has a parallel bus to enable fast data transfer. The Miniature Card is easily inserted in a host device and easily removed from it. Furthermore, an expansion card according to the standard can be inserted in and removed from the host device without switching off the power on the host device.

The Miniature Card standard is particularly well suited to implement the expansion card camera described above. The parallel interface of the Miniature Card enables fast transmission of picture data from the expansion card camera to the host device and the pictures can be stored in the host device's memory, if necessary.

Figure 5:
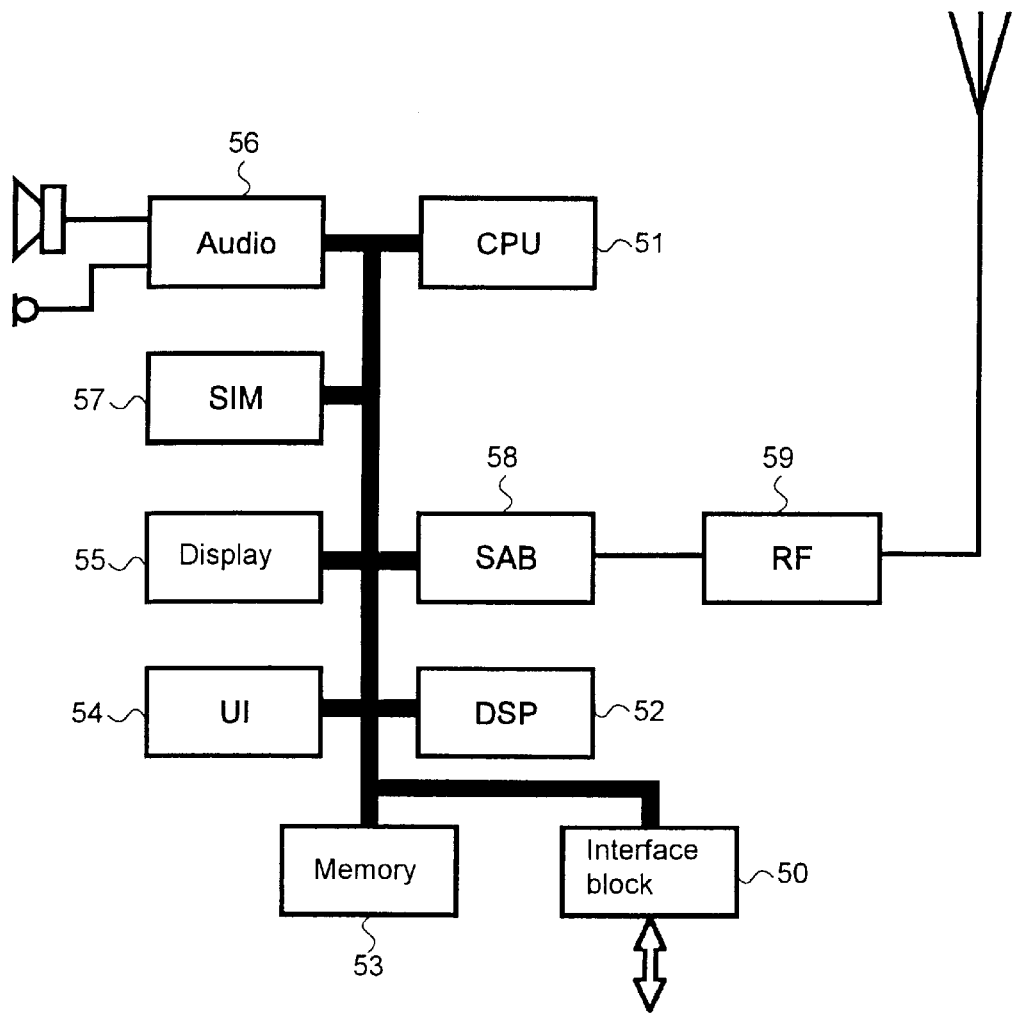
FIG. 5 shows by way of example a block diagram of a possible host device making use of the invention.

FIG. 5 shows by way of example a block diagram of a mobile communication device equipped with a Miniature Card interface 50. The mobile communication device comprises a processor block 51, signal processor block 52 and a memory means storage 53. The user interface of the mobile communication device comprises a user interface block 54, which may include a touch-sensitive display or a keypad, a display block 55 and an audio block 56, to which the loudspeaker and the microphone are connected. The SIM block 57 is a subscriber identification module (SIM) card which includes the user's phone number, among other things. The system ASIC block (SAB) 58 of the mobile communication device is responsible for the digital interfacing of the transmitted and received signal and comprises, among other things, buffer circuits for the digital data conveyed in both directions. The ASIC block 58 also performs the digital modulation of data. The ASIC block 58 is connected to a radio-frequency part 59 which comprises the radio-frequency parts typical of a mobile communication device for connecting the mobile communication device to a telecommunication network via the radio path. The ASIC block comprises one or more ASIC circuits, ie. application specific integrated circuits implemented according to the requirements of the customer. The host device according to FIG. 5 is used as an example in the description of FIGS. 6 and 7 below.

Figure 6:
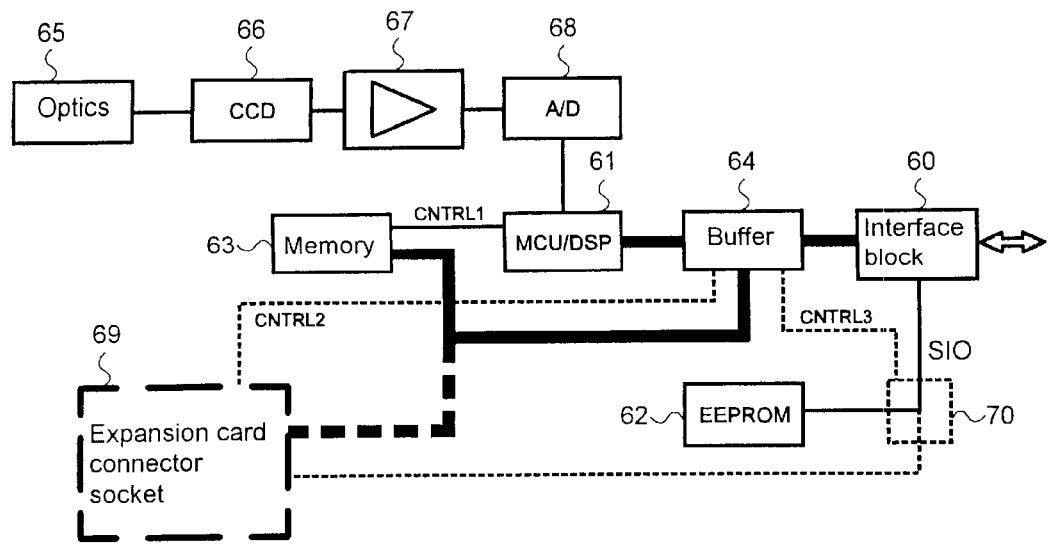
FIG. 6 shows by way of example a block diagram of an expansion card camera according to the invention.

FIG. 6 shows by way of example a block diagram of a digital camera realized on a Miniature Card and comprising a microprocessor 61 or a digital signal processor 61. An EEPROM memory unit 62 is connected to the serial input/ output (SIO) bus of the card. The host device can use the SIO bus to read the data concerning the contents of the card and various initial parameters, for example. The memory block 63 of the expansion card is used for storing the control software of the expansion card, and the memory block also has got free memory for pictures to be stored. The expansion card control block 61 controls the memory block 63 by means of one or more control signals CNTRL1. The control block 61 also compresses the picture stored in the memory block and decompresses the compressed picture as the picture is read from the memory onto the display of the host device. The buffer block 64 is an ASIC circuit performing the routing of data and address buses between the expansion card control block 61 and the memory 63, between the expansion card control block 61 and the host device, and between the expansion card memory 63 and the host device. The buffer block 64 can be controlled both by the expansion card control block 61 and the processor of the host device. The optical block 65 produces an image for the picture-sensing element 66, and the amplifier block 67 connected to said picture-sensing element amplifies and shapes the signal into a form suitable for an A/D conversion. The control block 61 fetches the picture data from the A/D converter 68. The expansion card is connected to the host device via an interface 60.

The expansion card camera may additionally include an expansion card connector socket so that a second expansion card, such as a memory expansion board, can be added to the camera module realized by an expansion card. Such an expansion card equipped with an expansion card connector socket is naturally bigger than an ordinary expansion card and does not necessarily entirely fit inside the host device cover.

Blocks and connections depicted by a dashed line in FIG. 6 denote an embodiment of the invention where the expansion card camera has an expansion card connector socket 69 for an additional expansion card. In such an embodiment, the buffer block 64 also controls the additional expansion card by means of one or more CNTRL2 signals. In addition, the buffer block 64 carries out the connection of the SIO bus to the EEPROM memory 62 of the expansion card or to the EEPROM memory of the additional expansion card by means of a switch element 70 controlled by a control signal CNTRL3. In this case, too, the buffer block 64 can be controlled either by the expansion card control block 61 or by the host device processor.

The operation of the expansion card camera shown in FIG. 6 together with a host device is as follows. When the power is switched on the host device, the host device reads through the expansion card SIO bus the expansion card information and thus learns the type of the expansion card. If the information indicates that the expansion card has an expansion card connector socket 69 for an additional expansion card, the processor of the host device drives the buffer block 64 to use the CNTRL3 signal to drive the switch element 70 to connect the SIO bus of the expansion card connector socket to the SIO bus of the expansion card so that the host device can fetch the information of the additional expansion card possibly located in the expansion card connector socket. When the camera is operating, the picture data from the A/D converter 68 is taken substantially unchanged via the expansion card control block 61, buffer block 64, and interface 60, 50 to the host device bus and therefrom to the host device display 55. The system updates the picture substantially continuously. When the user wants to take a picture, ie. save the currently displayed picture in the system memory, he pushes a certain button or gives another corresponding indication through the user interface block 54. Then the host device processor drives the expansion card control block 61 to start the compression of the picture. Having completed the compressing the expansion card control block 61 saves the compressed picture in the memory 63 by means of the buffer block 64. When the user wants to examine the picture, he pushes a certain second button or gives another corresponding indication through the user interface block 54. Then the host device processor 51 sends a command to the expansion card control block 61 which then fetches the picture from the memory 63 and decompresses it. Having completed the decompression the expansion card control block 61 sends the picture data to the host device by means of the buffer block 64 and interface 60, 50, and the host device processor takes the picture to the display unit 55.

Figure 7:
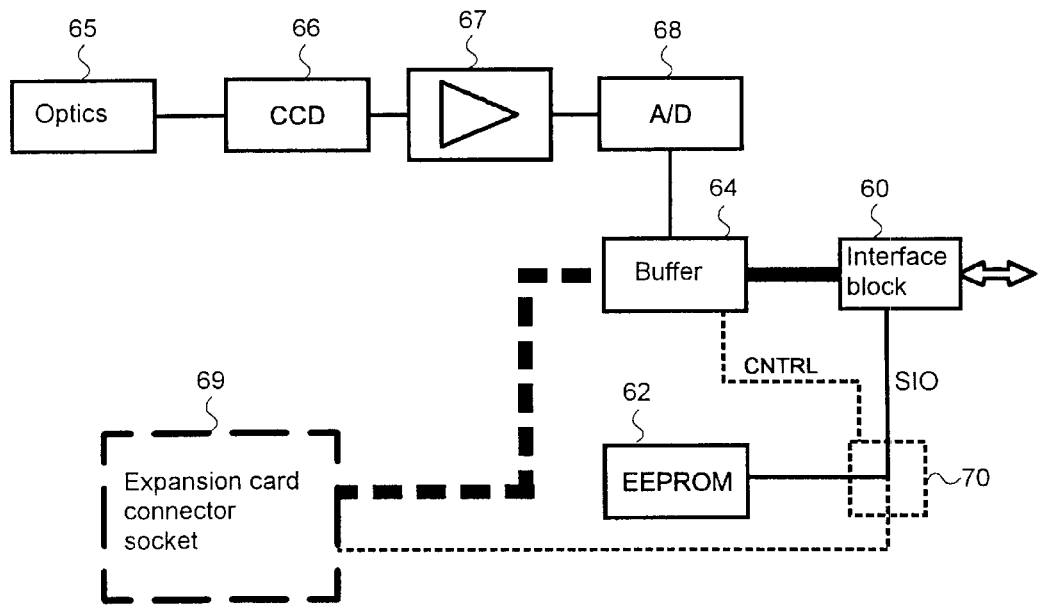
FIG. 7 shows by way of example a block diagram of another expansion card camera according to the invention.

FIG. 7 shows an example of an embodiment of the invention wherein the expansion card camera according to the invention does not comprise a microprocessor or a digital signal processor. An EEPROM memory unit 62 is connected to the SIO bus of the card. The host device can use the SIO bus to read the data concerning the contents of the card and various initial parameters, for example. The optical block 65 produces an image for the picture-sensing element 66, and the amplifier block 67 connected to said picture-sensing element amplifies and shapes the signal into a form suitable for an A/D conversion. A buffer block 64 connected to the A/D converter 68 carries out the serial-to-parallel conversion of the picture data if the output of the A/D converter 68 is in serial format. The buffer block 64 serves only as a buffer if the output of the A/D converter 68 is in parallel format. From the buffer block 64 the picture data is taken direct to the host device data bus via an interface 60, 50. In the case of the embodiment shown in FIG. 7, the operation of the camera is controlled by the host device processor. The driver software for the camera is then located in the host device's memory and the pictures are stored in the host device's memory.

Blocks and connections depicted by dashed lines in FIG. 7 denote an embodiment of the invention where the expansion card camera has an expansion card connector socket 69 for an additional expansion card. The buffer block 64 carries out the connection of the SIO bus to the EEPROM memory 62 of the expansion card and to the EEPROM memory of the additional expansion card by means of a control signal CNTRL and a switch element 70. The host device can also drive the buffer block 64 to connect the signals of the additional expansion card directly to the expansion card interface 60.

The operation of the expansion card camera shown in FIG. 7 together with a host device is as follows. When the power is switched on the host device, the host device reads through the expansion card SIO bus the expansion card information and thus learns the type of the expansion card. If the information indicates that the expansion card has an expansion card connector socket 69 for an additional expansion card, the processor of the host device drives by means of the buffer block 64 the switch element 70 to connect the SIO bus of the expansion card connector socket to the SIO bus of the expansion card so that the host device can fetch the information of the additional expansion card possibly located in the expansion card connector socket. When the camera is operating, the picture is conveyed continuously to the host device display and the system updates the picture substantially continuously. When the user wants to take a picture, ie. save the currently displayed picture in the system memory, he pushes a certain button or gives another corresponding indication through the user interface block 54. Then the host device processor, in the example of FIG. 5, either a digital signal processor 52 or a microprocessor 51, compresses the picture and saves it in the host device memory 53. When the user wants to examine the stored picture, the host device processor 51, 52 fetches the picture from the memory 53, decompresses it and takes it to the display 55.

In one advantageous embodiment of the invention, the expansion card device further comprises control means for controlling the functions implemented with the equipment on the expansion card. The control means may control all said functions instead of the control unit of the host device, or the control means may provide control of only part of said functions. The control means may also provide exclusive control of a function, providing the only way of using said function. Further, the control means may provide a second way of controlling a function in addition to the control unit of the host device. Advantageously said control means provides an additional easy way for the user to control an important function. One example of such a control means is the shutter button of an expansion card camera, which the user can press to take a picture instead of using the control unit of the host device.

The block diagrams shown in FIGS. 5, 6 and 7 are just examples of a few possible embodiments. It is obvious to one skilled in the art that applications of the invention are not limited to these examples or to other examples presented in this patent application but may vary within the scope of the claims set forth below.

The mobile communication device camera system according to the invention is a small and compact entity constituting a single discrete device, and the user need not carry with him any external accessories such as connection cables.

When buying a host device, the user need not know whether he will ever need a camera because, thanks to the modular architecture of the system, he can later add a camera to the host device. On the other hand, since in the system according to the invention the camera is not an integral part of the host device, the user need not pay the additional cost of a camera in the price of the host device if he has no need for a camera.

In addition, a camera in the system according to the invention can be connected to almost all host devices complying with the Miniature Card standard.

In the system according to the invention, the host device need not be equipped with all possible accessories and functions that may be used by some of the users at some point, but functions, which are less frequently used, can be realized on expansion cards, so that the host device becomes simpler and the acquisition costs paid by the user become lower.

What is claimed is:

1. A system for communication and data processing having a portable host device and a control unit in the host device for controlling the functions of the host device comprising:
    a cellular telephone unit in the host device connected to said control unit;
    at least one connector socket in the host device for connecting an expansion card to said control unit, said socket adapted to receive the expansion card, wherein, in the received position, a surface of the expansion card cooperates with a surface of the host device to define an exterior surface for the system;
    at least one expansion card for adding an additional function in the function selection of the host device, the expansion card having elements required to realize said additional function;
    a control program in the expansion card required to control said elements;
    said control program being adapted for execution at least via the user interface of the host device.

2. The system of claim 1, wherein, in the received position, the expansion card is inside the host device.

3. The system of claim 1, wherein, in the received position, the expansion card is partly outside the host device.

4. The system of claim 1, wherein said elements required to realize said additional function comprise an accessory integrated to the expansion card.

5. The system of claim 4, wherein, in the received position, the accessory integrated to the expansion card is at least partly outside the host device.

6. The system of claim 4, wherein said accessory comprises a user interface and said control program is adapted for execution partly via the user interface of host device and partly via the user interface of the accessory.

7. The system of claim 1, wherein said additional function is an interface for an external accessory and said elements required to realize said additional function comprise connecting means for connecting external accessory to the host device.

8. The system of claim 7, wherein, in the received position, a surface of the connecting means for connecting external accessory, together with the surface of the rest of the expansion card, cooperates with a surface of the host device to define an exterior surface for the system.

9. The system of claim 7, wherein the connecting means comprise a connector.

10. The system of claim 7, wherein the connecting means comprise a connector socket.

11. The system of claim 1, wherein said expansion card is an expansion card complying with the Miniature Card standard.

12. The system of claim 1, comprising more than one control program in the expansion card for connection to host devices of various types, the host device being designated to use that particular version of the expansion card control program which is adapted to that particular host device.

13. An expansion card adapted to be fitted into a connector socket in a portable host device, said portable device having a control unit and a cellular telephone unit connected to said control unit, said expansion card comprising:
    a housing having a shape which enables said expansion card to fit into said socket, said socket adapted to receive the expansion card, wherein, in the received position, the expansion card is connected to said control unit and a surface of said housing of said expansion card cooperates with a surface of said portable device to define an exterior surface for said portable device;
    elements for realizing an additional function for said portable device; and
    a memory element for storing software required for controlling said elements, wherein said software is adapted for execution at least via the user interface of the portable device.

14. The expansion card of claim 13, comprising:
    a connector socket for additional expansion cards.

15. The expansion card of claim 13, wherein said elements required for realizing said additional function comprise an accessory integrated to the expansion card.

16. The expansion card of claim 15, wherein said accessory comprises a microphone.

17. The expansion card of claim 15, wherein said accessory is a security device.

18. The expansion card of claim 15, wherein said accessory is a digital camera.

19. The expansion card of claim 13, wherein said additional function is an interface for an external accessory and said elements for realizing said additional function comprise connecting means for connecting external accessory to the host device.

20. The expansion card of claim 19, wherein the connecting means comprise a connector.

21. The expansion card of claim 19, wherein the connecting means comprise a connector socket.

22. The system of claim 13, wherein said expansion card is an expansion card complying with the Miniature Card standard.

23. A portable device for personal communication having a cellular telephone unit and at least one expansion card connector socket for connecting expansion cards to the device for adding an additional function to the functions of the device;

wherein said socket is adapted to receive the expansion card in a position, such that the surface of the expansion card cooperates with a surface of the host device to define an exterior surface for the device; and further wherein the device is arranged to read identification information from at least one of said expansion cards when connected to the expansion card connector socket;

the device is arranged to determine whether said identification information indicates that the expansion card comprises the program needed for controlling the expansion card, to control the functions of the expansion card by means of said program, wherein said program is adapted for execution at least via the user interface of the host device.

* * * * *